(12) United States Patent
Todorovic

(10) Patent No.: US 10,364,745 B2
(45) Date of Patent: Jul. 30, 2019

(54) AIR INTAKE ARRANGEMENT

(71) Applicant: ROLLS-ROYCE DEUTSCHLAND LTD & CO KG, Blankenfelde-Mahlow, Dahlewitz (DE)

(72) Inventor: Predrag Todorovic, Berlin (DE)

(73) Assignee: ROLLS-ROYCE DEUTSCHLAND LTD & CO KG, Dahlewitz (DE)

( * ) Notice: Subject to any disclaimer, the term of this patent is extended or adjusted under 35 U.S.C. 154(b) by 230 days.

(21) Appl. No.: 14/954,406

(22) Filed: Nov. 30, 2015

(65) Prior Publication Data
US 2016/0160757 A1 Jun. 9, 2016

(30) Foreign Application Priority Data

Dec. 8, 2014 (GB) .................................. 1421773.1

(51) Int. Cl.
*B64D 33/02* (2006.01)
*F02C 7/04* (2006.01)
*F02C 7/052* (2006.01)
*F02C 6/20* (2006.01)

(52) U.S. Cl.
CPC ............... *F02C 7/04* (2013.01); *B64D 33/02* (2013.01); *F02C 7/052* (2013.01); *B64D 2033/022* (2013.01); *B64D 2033/0293* (2013.01); *F02C 6/206* (2013.01); *F05D 2220/323* (2013.01); *F05D 2250/16* (2013.01); *F05D 2260/20* (2013.01); *F05D 2260/607* (2013.01); *F05D 2270/17* (2013.01); *Y02T 50/672* (2013.01); *Y02T 50/675* (2013.01)

(58) Field of Classification Search
None
See application file for complete search history.

(56) References Cited

U.S. PATENT DOCUMENTS

| | | | | |
|---|---|---|---|---|
| 3,329,377 A | * | 7/1967 | Peterson ................ | B64D 15/00 244/53 B |
| 4,047,911 A | * | 9/1977 | Krojer ...................... | F02C 7/05 244/53 B |
| 4,250,703 A | * | 2/1981 | Norris .................... | B64D 33/02 244/53 B |

(Continued)

FOREIGN PATENT DOCUMENTS

GB         2 203 801 A         10/1988

OTHER PUBLICATIONS

Apr. 26, 2016 Search Report issued in European Patent Application No. 15 19 7072.

(Continued)

*Primary Examiner* — Carlos A Rivera
*Assistant Examiner* — Theodore C Ribadeneyra
(74) *Attorney, Agent, or Firm* — Oliff PLC

(57) ABSTRACT

An intake for channeling air flowing past a propeller to an inlet of an aircraft engine that drives the propeller with a drive shaft, the intake including: a static cowling that extends along an axis and that flares outward at an upstream end of the static cowling, and an intake slot that is formed in the static cowling. The intake slot connecting to a passage of the inlet of the aircraft engine, the intake slot including an arched opening that extends less than 360 degrees of a circumference of the static cowling, and the intake slot having a downstream lip with a curved profile that blends into the static cowling.

17 Claims, 10 Drawing Sheets

(56) References Cited

U.S. PATENT DOCUMENTS

| | | | | |
|---|---|---|---|---|
| 4,346,860 | A | * | 8/1982 | Tedstone .................. F02C 7/05 244/53 B |
| 4,617,028 | A | | 10/1986 | Ray et al. |
| 4,844,382 | A | * | 7/1989 | Raisbeck ............... B64D 33/02 244/53 B |
| 5,725,180 | A | * | 3/1998 | Chamay ................ B64D 33/02 244/53 B |
| 6,990,798 | B2 | * | 1/2006 | Bouchard ................ F02C 7/04 137/15.1 |
| 2003/0113205 | A1 | | 6/2003 | Negulescu et al. |
| 2004/0179941 | A1 | | 9/2004 | Negulescu |
| 2008/0156187 | A1 | | 7/2008 | Tingle et al. |
| 2010/0044522 | A1 | | 2/2010 | Siercke et al. |
| 2014/0053532 | A1 | * | 2/2014 | Zysman ................ B64D 33/00 60/226.1 |

OTHER PUBLICATIONS

Jun. 18, 2015 Search Report issued in British Application No. 1421773.1.

* cited by examiner

AIR INTAKE ARRANGEMENT

The present disclosure relates to gas turbine engines, particularly turbo-propeller (turboprop) gas turbine engine in which the propeller is positioned upstream of the gas turbine, and turbo-shaft gas turbine engines.

Turboprop or turbo-shaft gas turbine engines suffer from a loss of power and higher vibration due to erosion of the gas turbine compressor by dust, debris, or other foreign objects. The dust, debris and other foreign objects (FOs) may be lying on the ground on, or close to airport runways, and entrained into the air entering the gas turbine intake duct or ducts, during MTO (Take Off) or TRU (Thrust Reverser) operating modes. The erosion can be more severe when the engine is in thrust reverse mode where the reversed air flow can lift foreign objects from the runway, or neighbouring ground, and make it airborne and ingestible into the core engine.

Different arrangements are proposed to try and alleviate this problem. In U.S. Pat. No. 3,329,377 a forward facing air intake has a channel with a deflection surface that can be adjusted to provide a substantial angle that deflects clean air towards the engine whilst non-deflected particles pass without deflection to an outlet of the channel and away from the engine.

A different separating duct is described in GB2203801 where a pivoted flap may be used to control the area of the duct channel outlet.

U.S. Pat. No. 4,047,911 describes an intake arrangement with an axially translating fairing that seals against a cowling to adjust the air intake path in take-off and landing phases.

U.S. Pat. No. 4,617,028 describes an intake duct with a collection chamber to capture and store foreign objects and prevent them entering the engine In each of these arrangements there are either aerodynamic penalties due to separation channels or weight penalties due to the necessary provision of actuators and movement mechanisms that adjust the operating profile of the deflectors.

It is an object of the invention to seek to address one or more of these and other problems.

According to a first aspect there is provided an intake for channeling air flowing past a propeller to an inlet of an aircraft engine driving the propeller through a gearbox and drive shaft comprising: a static cowling extending about an axis and which flares from an upstream end, an intake slot formed in the flared portion which bounds a passage to the inlet of the aircraft engine, the intake slot opening over less than 360 degrees of the circumference of the cowling and having an axially rearward edge that blends into the cowling through a curve having a vertex, the vertex being radially inside a projected extension of the flared portion from an upstream portion of the flared cowling across the intake slot.

The slot may have a circumferential length and an axial width, the circumferential length being greater than the axial width and preferably 2, 3 or more multiples greater.

The upstream portion of the flared cowling is axially forward of the intake slot and may be formed of any suitable material e.g. composite or sheet metal.

The vertex acts as a lip which, as it is located radially inside the projected extension of the flared portion helps provide clean air to the engine as foreign bodies entrained within the air flow over the cowling hit radially outside the vertex and ricochet away from the engine. Larger foreign objects tend to follow a trajectory which is not the same turned trajectory as the air flow stream due to their higher mass and inertia and are not ingested into the engine.

An array of rotating aerofoils may be provided immediately forward and adjacent the upstream end of the static cowling. Rotating aerofoils are known in the field of this disclosure and an array of aerofoil of any appropriate form may be used.

Locating the rotating aerofoils forward of the upstream end of the static cowling allows the rotating blades to be separated from the cowling. The aerodynamic profile of the cowling can be aerodynamically designed without suffering centrifugal forces. The aerodynamic profile of the cowling can be complex.

The arc angle of the intake slot is less than 360 degrees around the circumference of the static cowling and may be less than 180 degrees. The arc angle of the intake slot around the static cowling is preferably greater than 45 degrees and preferably more than 90 degrees.

The area of the slot may be of a size that reduces edge swirling effects within the inlet and can provide an improvement in the engine performance and reliability since there is more equal loading at the compressor inlet plane.

One or more structural rods connecting the gearbox and the engine may extend across the intake slot. The rods may be aerodynamically shaped or protected by an aerodynamically shaped fairing. The rods or fairings may be shaped to guide the flow of air within the intake slot into the engine or for aerodynamical corrections of the flow in the inlet.

The intake slot may have an upstream edge comprising a partial boundary layer separator.

The upstream edge may be formed in the upstream portion of the cowling and may comprise a radially inwardly extending curve that curves from the outward surface of the cowling, possibly through a vertex, to provide an inside surface of the intake slot. Where the partial boundary layer separator is provided this can be used to improve the flow into the intake slot.

The partial boundary layer separator may comprise a circumferential channel for directing boundary layer away from the intake slot. The channel can extend around the cowling and can have open ends for exhausting the boundary layer air into the free stream flow away from the intake.

The partial boundary layer separator may further comprise one or more scoops for directing boundary layer air towards one or more gearbox elements. The scoops may open into the channel and direct air into a conduit that delivers air to the one or more gearbox elements, for example heat exchanger. Other devices may be cooled by the boundary layer air.

The static cowling may have a first part and a second part with a boundary between the first and second parts extending circumferentially around the cowling and being located immediately upstream of the partial boundary layer separator.

The first and second parts may be configured to move independently of each other. The effect of gaps between the first and second parts which can generate vortices or other flow disturbances in the boundary layer can be mitigated by inhibiting the entry of the disturbed boundary layer air into the intake.

The first and second parts may be configured to be separated to allow access to the inside of the cowling.

By enabling the cowling to be formed in two or more parts and configuring it such that the effects of the steps and gaps and other flow disturbances are mitigated allows the gearbox, the drive shaft and other components within the cowling to be easily inspected and maintained.

The cowling may have a further translating portion that in a stowed position is axially aft of the intake slot but is translated forward to be axially aligned with the intake slot during selected operating regimes.

The stowed position is typically used whilst the aircraft is in flight mode whilst the cowling is translated forward when the aircraft is in taxiing, landing or take-off mode.

The translating cowl may extend over a greater arc angle than the intake slot.

Embodiments will now be described by way of example only and with reference to the accompanying drawings in which.

Figure 1:
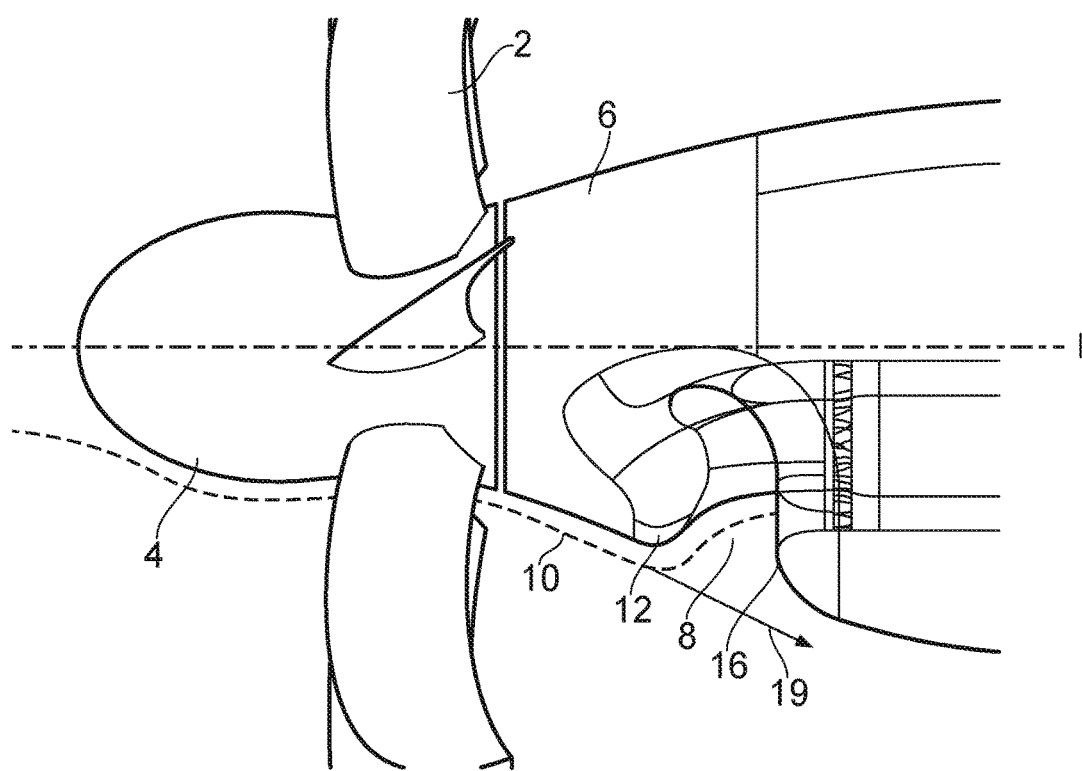
FIG. 1 depicts a side view of an inlet for a turbo-propeller gas turbine engine.

FIG. 1 depicts a side view of a front portion of a turbo-propeller gas turbine engine. The engine has an array of propeller blades 2 mounted on a rotating hub 4. The hub is aerodynamically profiled to direct a streamlined flow of air rearwards through passages between the propellers and over a static cowling 6 that has an intake 8 that supplies air to the engine. The arrangement has an axis 1 around which the cowling and hub extend. The hub is typically circular in cross-section to provide balance in rotational forces whilst the cowling may be circular, ovular or have another shape in cross-section as required for aerodynamic, engine running, aesthetic, or other purpose. Where the term axial is used it relates to the axis of the front portion of the engine, radial is the radial direction from this axis.

The propeller is driven by the gas turbine that causes the propellers to rotate. The drive may be direct or through a reduction gearbox that ensures the propellers operate as close to a design velocity as possible to give their optimum efficiency. The gearbox may be located forward of the intake slot to minimise the drive length.

The forward end of the cowling 6 is of a similar size as the downstream end of the rotating hub to aid the rearward flow of air and keep it streamlined. The cowling flares as it extends rearward and the air passing over the cowling predominantly follows the lines 10 shown in FIG. 1.

Figure 2:
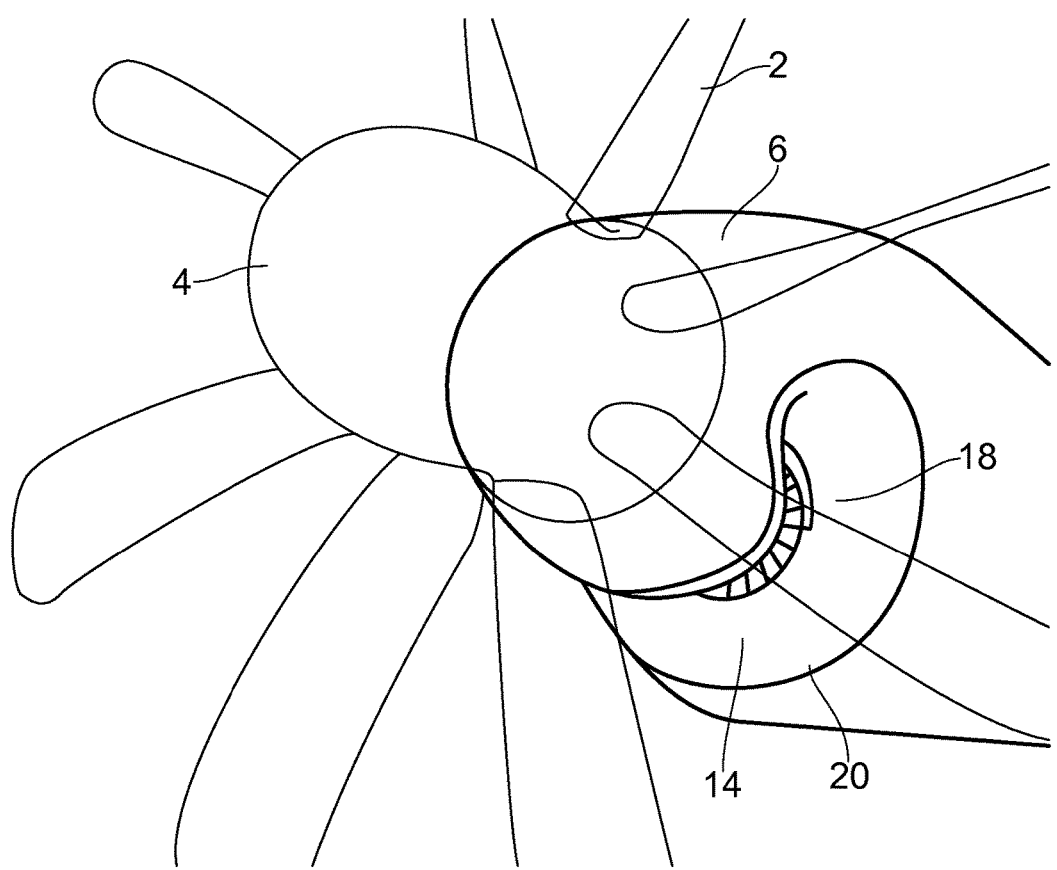
FIG. 2 depicts a perspective view of an inlet for a turbo-propeller gas turbine engine.
Figure 3:
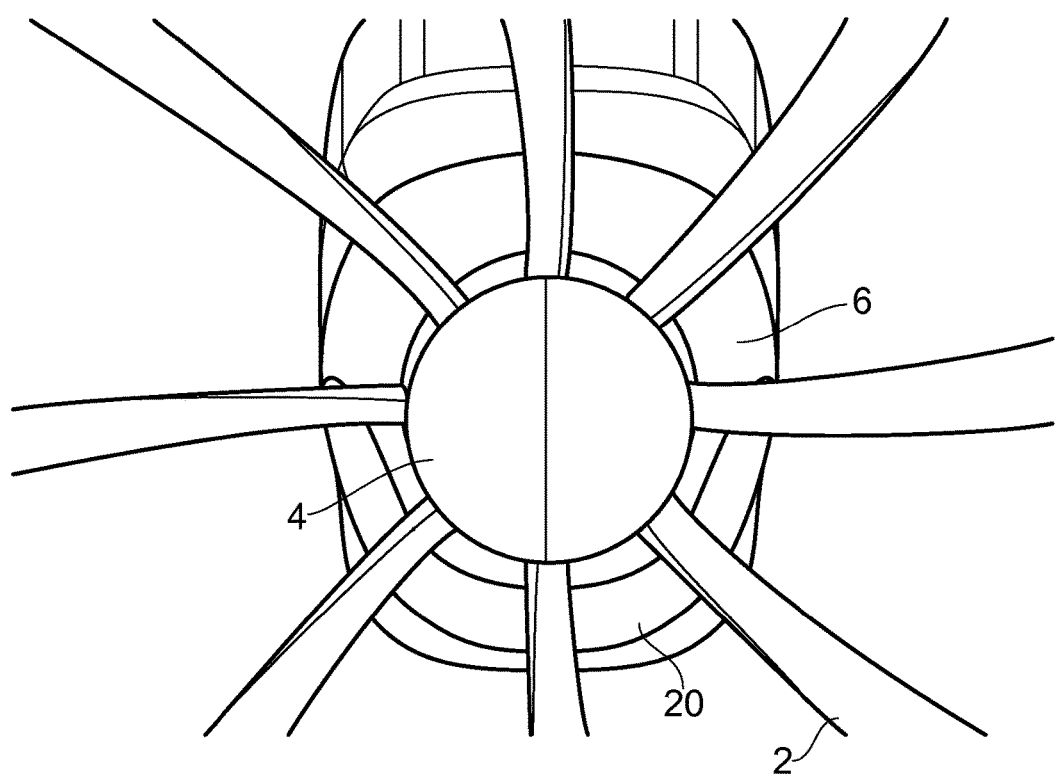
FIG. 3 depicts a front view of an inlet for a turbo-propeller gas turbine engine.

The intake 8 is in the form of a slot that extends circumferentially around the cowling and it has an upstream edge 12 and a downstream lip 14. The slot has a circumferential length and an axial width, the circumferential length being greater than the axial width and preferably 2, 3 or more multiples greater. This is shown more clearly in FIG. 2 and FIG. 3. The downstream lip has a curved profile that blends between the intake channel and the cowling. The lip has an axially forward leading edge that turns at the leading edge highlight 16 through a vertex from a radially inner surface 18 of the intake channel to the radially outer surface 20 of the cowling 6.

A straight line may be projected from the flaring cowling upstream of the intake slot across the intake slot to the cowling portion downstream of the intake slot. The line follows the projected profile of the cowling and either impacts the cowling portion downstream of the intake slot radially outside the highlight, or passes radially outside the cowling portion downstream of the intake slot. Particles and foreign bodies entrained within the air flow past the propellers follow the path of the solid arrow 19 due to their inertia being bigger than inertia of air. Particles impact the downstream cowling portion outside the highlight and ricochet away from the engine. Cleaner air is drawn into the engine through the intake channel. In the embodiment shown by the front view of FIG. 3, the highlight 14 is not visible as it is radially aligned to the upstream edge 12 of the slot 8. Such an arrangement ensures that the airflow, which has a radially outward component because of the flare of the cowling, is not directly channeled into the intake.

The relatively big intake slot that extends in an arc having an arc angle of around about 180 degrees of the cowling reduces swirling effects inside the inlet that further helps to reduce the drag whilst maintaining high separation efficiency.

Figure 4:
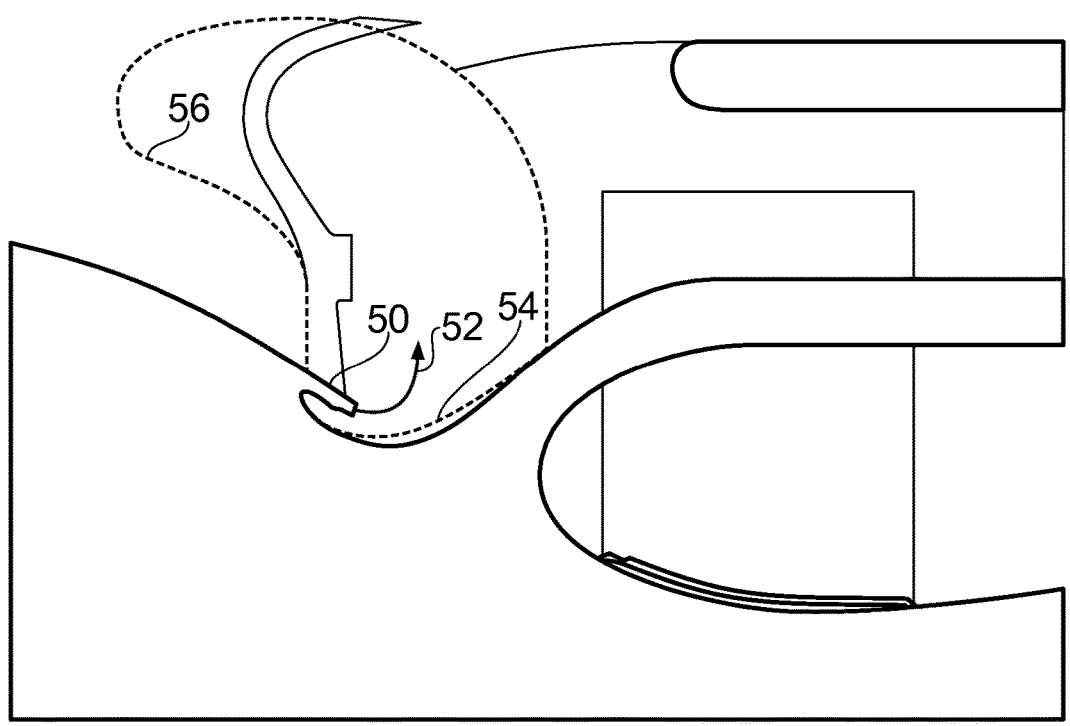
FIG. 4 depicts a cross-sectional view of an alternative arrangement of an inlet.
Figure 5:
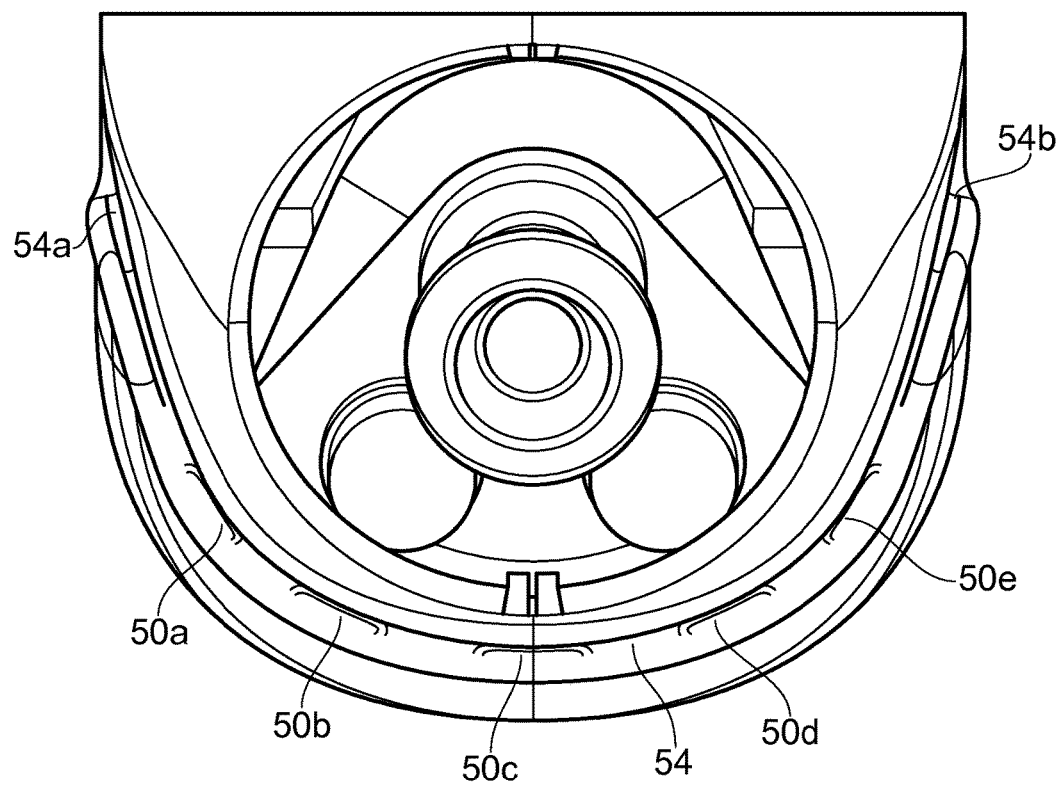
FIG. 5 depicts a front perspective view of the arrangement of FIG. 4.

FIG. 4 depicts a modification to the upstream edge of the slot where a scoop 50 is provided to direct boundary layer air for ventilation or purposes as shown by dotted arrow 52. Some, or all, of the boundary layer may be directed for ventilation and may be used to cool the propeller gearbox or flow over an oil-cooling heat-exchanger. FIG. 5 is a front view of the modified slot which shows 5 scoops 50a-50e opening to a channel 54. The channel is open at both ends 54a, 54b to exhaust boundary layer air in excess of that taken into the slots away from the intake slot and to ambient.

Figure 6:
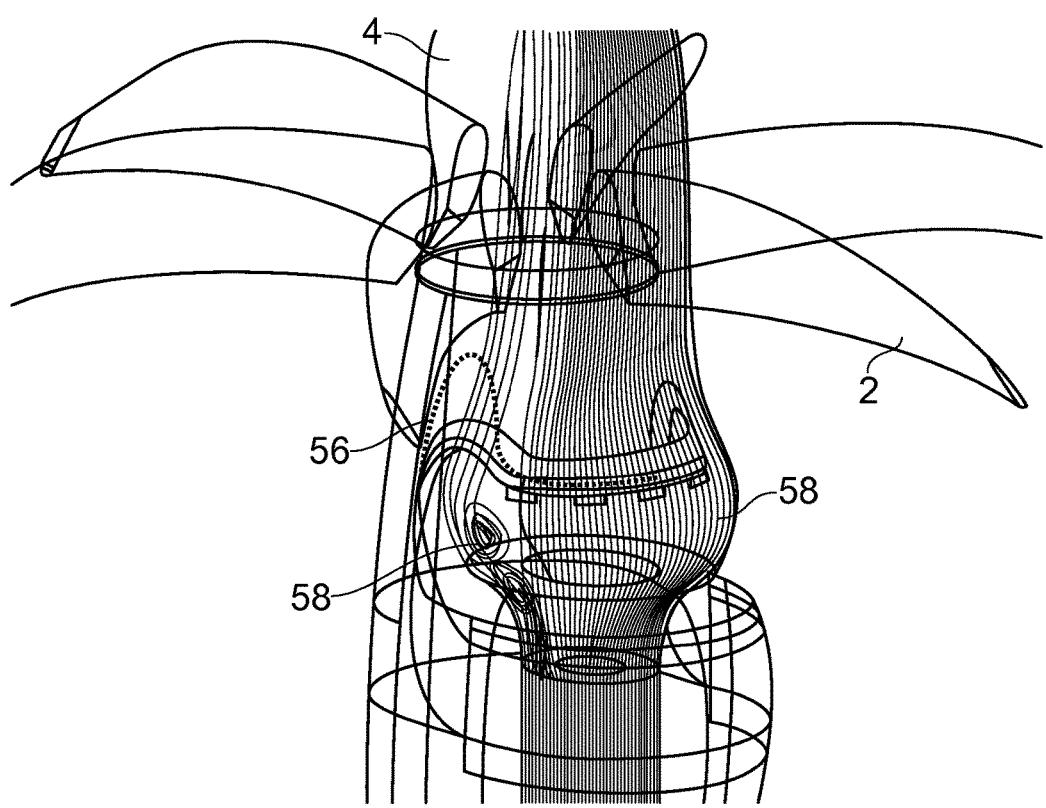
FIG. 6 depicts an underside perspective view of an alternative arrangement of an inlet.

The scoop at least partially removes the boundary layer air to further improve the flow into the inlet. By removing the boundary layer air a region of lower velocity can develop downstream of the upstream edge of the intake slot and it may be necessary to modify the inlet to minimise this region. One modification is to make the curvature of the upstream edge of the intake more shallow as shown by the dotted line 54 in FIG. 4 or, at the extremity of the arc of the inlet, to move the upstream edge of the inlet further forward to increase the axial length of the intake slot as indicated by the dotted line 56. This may be shown, for example, in FIG. 6 where the dotted line indicates the modified intake slot. The streamlines of the flow and the velocities are shown for the unmodified slot and indicates the area of low velocity 58 where the flow is more turbulent. By modifying the slot the turbulence is reduced and the flow presented to the engine inlet improved. The modification also minimises some side wind effects.

The scoop and channel arrangement also facilitates a modification to the engine construction where the inlet is fully attached to the engine such that it moves with the engine and is independent of any relative movement of the engine and the nacelle. The nacelle can be moved or removed independently of the inlet to allow access to components such as the accessory gear box, or the propeller gearbox. The boundary of the inlet to the nacelle should be upstream of the scoop and channel such that any flow effects initiated by the boundary can be taken away from the inlet inflow streamlines and not interfere with the flow in any significant way.

Figure 7:
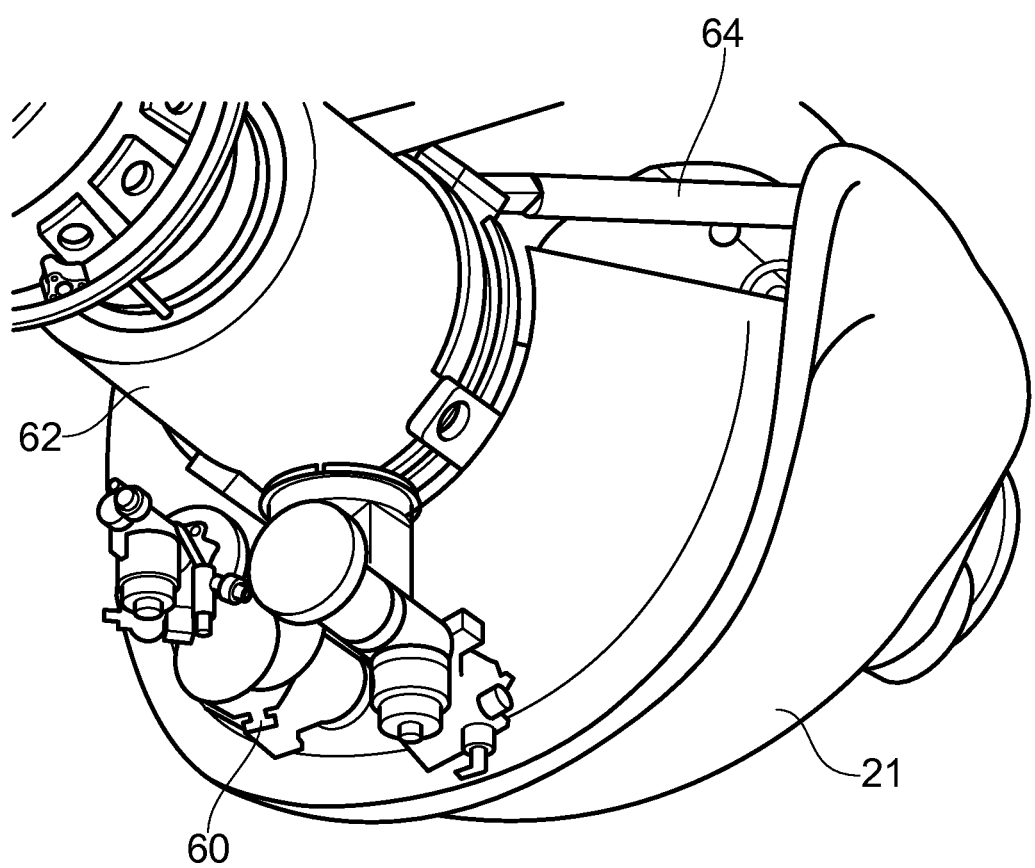
FIG. 7 is a perspective view from the rear of a multiple part cowling with part of the cowling removed.
Figure 8:
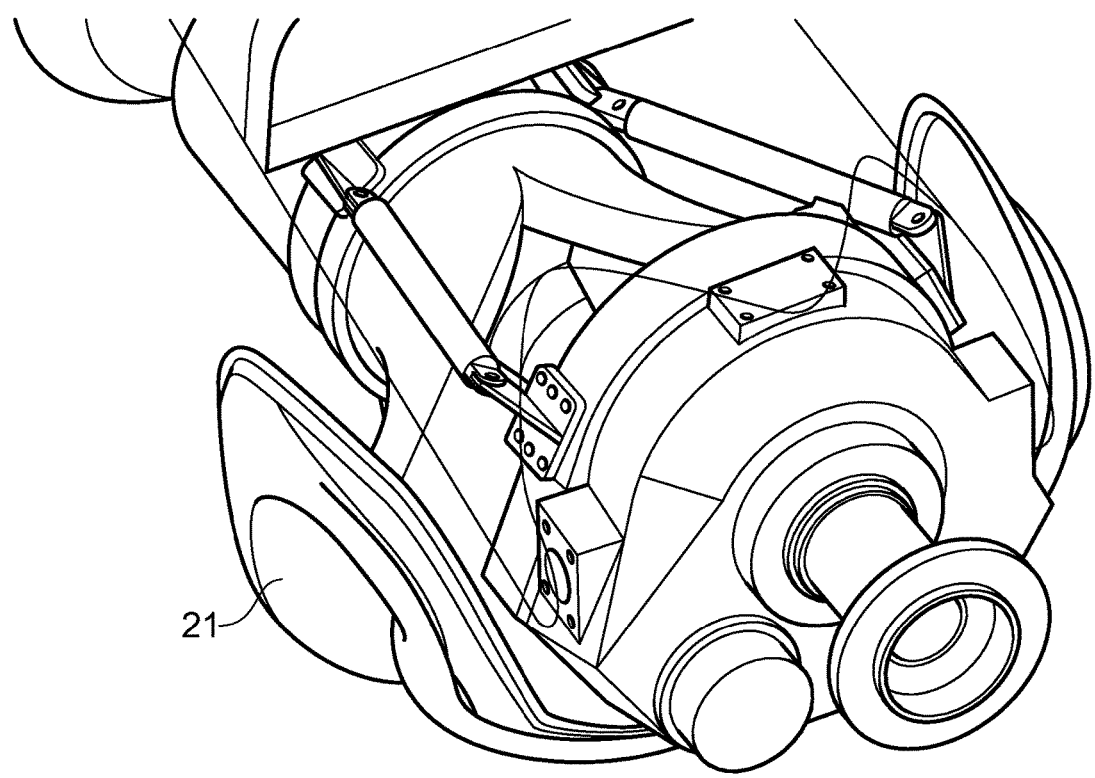
FIG. 8 is a perspective view from the front of a multiple part cowling with part of the cowling removed.

FIG. 7 depicts an arrangement where the rear half of the cowling has been removed to expose the accessory gearbox 60 and the engine core 62. The attached cowling is spaced from the engine support mounts 64 such that removing the cowling will not interfere with the mounts. FIG. 8 shows the same arrangement from a different perspective. The intake slot component 21 is a single piece moulding mounted to the engine case. The cowling 6 (not shown) fits against the periphery of the intake slot component.

In cases where the air flowing over the hub and the cowling is not streamlined e.g. during take-off or when the thrust reverser is engaged and where operation of a thrust reverser unit and ground effects can cause significant turbulence and additionally throw significant levels of particles into engine, it may be necessary to protect the intake by a translating cowl portion that sits axially across the intake.

Figure 9:
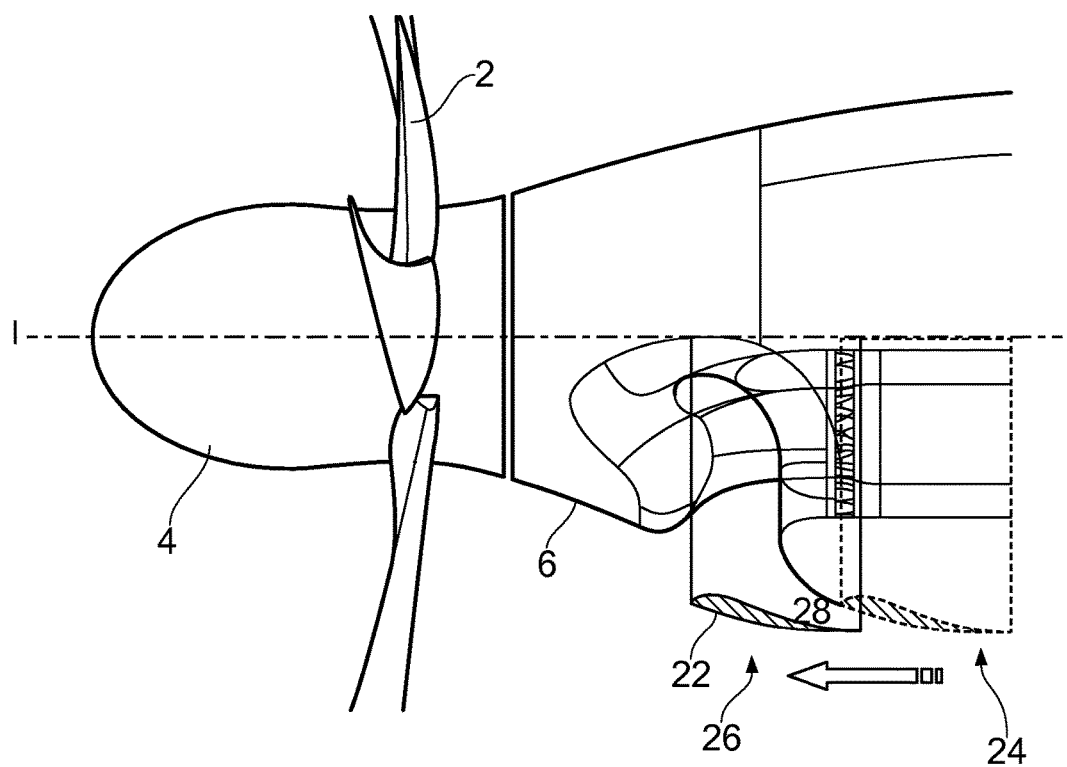
FIG. 9 depicts a modified side view of an inlet for a turbo-propeller gas turbine engine having an actuated flap for use in a thrust reverse mode.

An appropriate arrangement is shown in FIG. 9 where a translatable flap 22 that is normally in a stowed position 24 that is aerodynamically flush with the downstream cowling. When the flap is deployed e.g. to position 26 the flap forms a barrier against the ingress of air into the intake from any position other than from the front. In the deployed position the flap axially overlaps at least a portion of the intake slot.

The channel 28 formed between the flap and the intake is open at its rearward edge to permit the ejection of foreign bodies in the channel. The circumferential length of the flap may be equal to or greater than that of the intake slot or it may extend over a shorter suitable distance that is calculated either empirically or through modelling to prevent an acceptable amount of particles of a given size entering the intake. In either case the flap 22 extends across the bottom dead centre of the engine.

The flap is deployed where there is a high concentration of particles that may enter the intake from a direction other than from the forward opening. This is typically where the engine is operating in thrust reverse mode but may also occur when operating in idle and the runway is dirty or otherwise unprepared, or the aircraft is designed for take-off on water and where water ingress is a particular problem.

Figure 10:
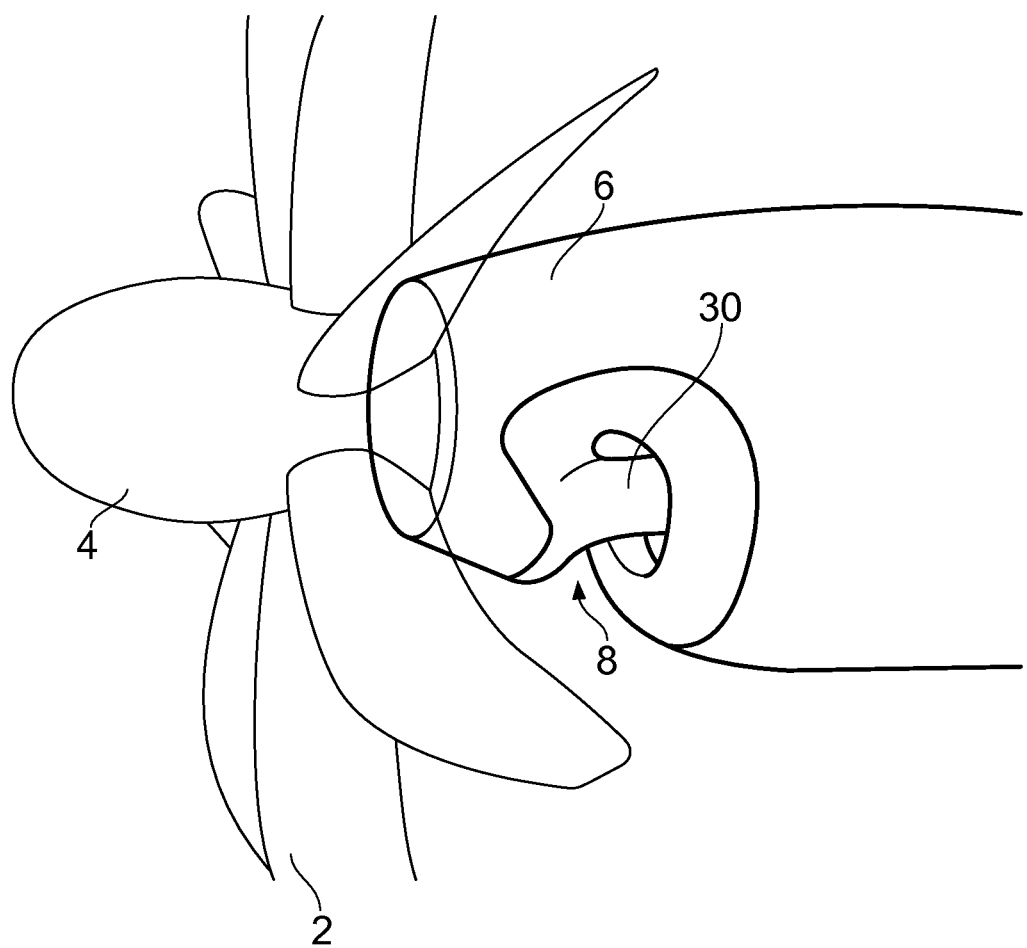
FIG. 10 depicts a perspective view of an alternative inlet for a turbo-propeller gas turbine engine.

Owing to the circumferential length of the intake slot one or more structural rods 30 connecting a gearbox and engine may extend across the intake. As shown in FIG. 10, these rods are aerodynamically shaped or covered with a fairing that can be shaped to help avoid the ingress of foreign debris and also help to steer the flow of air into the engine.

It will be appreciated that the arrangement described offers high inlet efficiency at low drag whilst providing high separation efficiency. The translatable flap is deployed only in certain regimes of the engine usage, while it is stowed into more aerodynamically efficient configuration when in flight conditions.

It will be understood that the invention is not limited to the arrangements described above and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. An intake for channeling air flowing past a propeller to an inlet of an aircraft engine that drives the propeller with a drive shaft, the intake comprising:
   a static cowling that extends along an axis and that flares outward at an upstream end of the static cowling;
   an intake slot that is formed in the static cowling, the intake slot connecting to a passage of the inlet of the aircraft engine, the intake slot opening over an arc that extends less than 360 degrees of a circumference of the static cowling having an axially rearward edge that blends into the static cowling through a curve having a vertex, wherein the vertex is radially inside a projected extension of the flared portion from an upstream portion of the flared cowling across the intake slot, and
   a translating cowl having a stowed position axially aft of the intake slot and a deployed position axially aligned with the intake slot, and
   wherein the translating cowl extends circumferentially over a shorter arc than the intake slot.

2. The intake according to claim 1, wherein an array of rotating aerofoils is disposed forward of the upstream end of the static cowling.

3. The intake according to claim 2, wherein the intake slot extends in an arc that is less than 180 degrees of the circumference.

4. The intake according to claim 2, wherein the intake slot extends in an arc that is greater than 45 degrees of the circumference.

5. The intake according to claim 1, wherein one or more structural rods that connect a gearbox and the aircraft engine extend across the intake slot.

6. The intake according to claim 5, wherein the rods are aerodynamically shaped or encased by an aerodynamically shaped fairing configured to help avoid the ingress of foreign debris and also help to steer the flow of air into the engine.

7. The intake according to claim 1, wherein the intake slot has an upstream edge that includes a partial boundary layer separator forming a circumferential channel for directing boundary layer away from the intake slot.

8. The intake according to claim 7, wherein the partial boundary layer separator further includes one or more scoops for directing boundary layer air into a conduit directed towards one or more gearbox elements.

9. The intake according to claim 7, wherein the static cowling has a first part and a second part, a boundary of the first part and of the second part extending circumferentially and located immediately upstream of the partial boundary layer separator.

10. The intake according to claim 9, wherein the first and second parts move independently of each other.

11. The intake according to claim 1, wherein in the deployed position a channel is opened between the static cowling and the translating cowl, a rear of the channel opening outside the static cowling.

12. The intake according to claim 1, wherein the arc of the intake slot has at least two portions, a first portion at a first end of the arc and a second portion towards the center of the arc, wherein the first portion has an upstream edge that is disposed axially forward of the second portion.

13. The intake according to claim 12, wherein the arc of the intake slot has a third portion at a second end of the arc that is opposite the first end, wherein the third portion has an upstream edge that is axially forward of the second portion.

14. An intake for channeling air flowing past a propeller to an inlet of an aircraft engine that drives the propeller with a drive shaft, the intake comprising:
   a static cowling that extends along an axis and that flares outward at an upstream end of the static cowling; and
   an intake slot that is formed in the static cowling, the intake slot connecting to a passage of the inlet of the aircraft engine, the intake slot opening over an arc that extends less than 360 degrees of a circumference of the static cowling having an axially rearward edge that blends into the static cowling through a curve having a vertex, wherein the vertex is radially inside a projected extension of the flared portion from an upstream portion of the flared cowling across the intake slot, wherein the intake slot is an arc having at least two portions, a first portion at an end of the arc and a second portion towards the center of the arc, wherein the first portion has an upstream edge that is disposed axially forward of the second portion, and the intake includes a translating cowl having a stowed position axially aft of the intake slot and a deployed position axially aligned with the intake slot, and wherein the translating cowl extends circumferentially over a shorter arc than the intake slot.

15. An intake for channeling air flowing past a propeller to an inlet of an aircraft engine that drives the propeller with a drive shaft, the intake comprising:

a static cowling that extends along an axis and that flares outward at an upstream end of the static cowling; and an intake slot that is formed in the static cowling, the intake slot connecting to a passage of the inlet of the aircraft engine, the intake slot opening over an arc that extends less than 360 degrees of a circumference of the static cowling having an axially rearward edge that blends into the static cowling through a curve having a vertex, wherein the vertex is radially inside a projected extension of the flared portion from an upstream portion of the flared cowling across the intake slot, wherein the intake slot is an arc having at least two portions, a first portion at an end of the arc and a second portion towards the center of the arc, wherein the first portion has an upstream edge that is disposed axially forward of the second portion, and the intake slot has an upstream edge that includes a partial boundary layer separator forming a circumferential channel for directing boundary layer away from the intake slot, and a translating cowl having a stowed position axially aft of the intake slot and a deployed position axially aligned with the intake slot, and wherein the translating cowl extends circumferentially over a shorter arc than the intake slot.

16. The intake according to claim 15, wherein the static cowling has a first part and a second part, a boundary of the first part and of the second part extending circumferentially and located immediately upstream of the partial boundary layer separator.

17. The intake according to claim 16, wherein the first and second parts can move independently of each other.

* * * * *